US012764844B2

(12) United States Patent
Li

(10) Patent No.: US 12,764,844 B2
(45) Date of Patent: Oct. 13, 2026

(54) SMART GLASSES

(71) Applicant: LUXSHARE ELECTRONIC TECHNOLOGY (KUNSHAN) LTD., Kunshan City (CN)

(72) Inventor: Junlong Li, Kunshan City (CN)

(73) Assignee: LUXSHARE ELECTRONIC TECHNOLOGY (KUNSHAN) LTD., Kunshan City (CN)

( * ) Notice: Subject to any disclaimer, the term of this patent is extended or adjusted under 35 U.S.C. 154(b) by 26 days.

(21) Appl. No.: 19/003,569

(22) Filed: Dec. 27, 2024

(65) Prior Publication Data

US 2026/0122747 A1 Apr. 30, 2026

(30) Foreign Application Priority Data

Dec. 29, 2023 (CN) ......................... 202323658483.8

(51) Int. Cl.
*H05B 47/12* (2020.01)
*H05B 45/20* (2020.01)

(52) U.S. Cl.
CPC ............. *H05B 47/12* (2020.01); *H05B 45/20* (2020.01)

(58) Field of Classification Search
CPC ................................ H05B 47/12; H05B 45/20
See application file for complete search history.

(56) References Cited

U.S. PATENT DOCUMENTS 10,359,311 B2 7/2019 Howell et al.
10,509,466 B1 * 12/2019 Miller .................... H04N 23/57
12,560,824 B1 * 2/2026 Chen ........................ G02C 1/06
2017/0068120 A1 * 3/2017 Shiratori ................. H04M 1/05
2017/0299956 A1 * 10/2017 Holland ................. G02B 27/14
(Continued)

FOREIGN PATENT DOCUMENTS

CN 213581648 U * 6/2021
CN 215915590 U * 3/2022
(Continued)

OTHER PUBLICATIONS

"Shift register," Wikipedia, URL:https://en.wikipedia.org/wiki/Shift-register, May 14, 2025, pp. 1-4.
(Continued)

*Primary Examiner* — Seokjin Kim
(74) *Attorney, Agent, or Firm* — Birch, Stewart, Kolasch & Birch, LLP

(57) ABSTRACT

Provided are smart glasses. The smart glasses include a lens and a light emission control circuit. The light emission control circuit includes a user state collection module, a processing module and a light emission module. An output terminal of the user state collection module is connected to an input terminal of the processing module. An output terminal of the processing module is connected to a control terminal of the light emission module. A light emission direction of the light emission module points to a side surface of the lens. The user state collection module is disposed so that the current state of a user can be monitored. The side surface of the lens is provided with the light emission module, and by controlling the light emission module to emit light, light emitted by the light emission module is refracted through the lens to change the color of the lens.

9 Claims, 7 Drawing Sheets

(56) References Cited

U.S. PATENT DOCUMENTS

| | | | | |
|---|---|---|---|---|
| 2023/0185114 | A1 | 6/2023 | Yu et al. | |
| 2023/0330386 | A1* | 10/2023 | Rigby | A61M 21/02 |
| 2024/0160024 | A1* | 5/2024 | Choi | G02B 27/0093 |
| 2024/0236557 | A1* | 7/2024 | Law | G02C 11/00 |
| 2024/0298921 | A1* | 9/2024 | Howell | A61B 7/00 |
| 2024/0389889 | A1* | 11/2024 | Liao | A61B 5/1176 |
| 2025/0065145 | A1* | 2/2025 | Tumlinson | A61N 5/0618 |
| 2025/0216685 | A1* | 7/2025 | Duan | G02B 27/0172 |
| 2026/0072291 | A1* | 3/2026 | Cakmakci | G02B 27/0172 |

FOREIGN PATENT DOCUMENTS

| | | | | | |
|---|---|---|---|---|---|
| CN | 116990984 | A | * | 11/2023 | A61N 5/0613 |
| EP | 3 112 988 | A1 | | 1/2017 | |
| JP | 2023040326 | A | * | 3/2023 | |
| KR | 20260001152 | A | * | 1/2026 | G02C 7/027 |
| WO | WO-2022091398 | A1 | * | 5/2022 | B60K 35/60 |
| WO | WO-2023038184 | A1 | * | 3/2023 | H05K 1/14 |
| WO | WO-2023063533 | A1 | * | 4/2023 | G02B 27/0176 |
| WO | WO-2023128622 | A1 | * | 7/2023 | H02J 7/00 |

OTHER PUBLICATIONS

Partial European Search Report for European Application No. 24222976.3, dated Jun. 3, 2025.

* cited by examiner

SMART GLASSES

CROSS-REFERENCE TO RELATED APPLICATION

The present application claims priority to Chinese Patent Application No. 202323658483.8, filed with the China National Intellectual Property Administration (CNIPA) on Dec. 29, 2023, the disclosure of which is incorporated herein by reference in its entirety.

TECHNICAL FIELD

The present application relates to the field of wearable devices and, in particular, to smart glasses.

BACKGROUND

The color of a lens of existing glasses is determined by a material of the lens or an additive. Moreover, the color of the lens cannot be changed once determined, making it difficult to meet application requirements of a user in different scenarios.

SUMMARY

A main object of the present application is to provide smart glasses to solve the problem in the related art that the color of the lens cannot be changed.

To achieve the preceding object, the present application provides smart glasses. The smart glasses include a lens and a light emission control circuit.

The light emission control circuit includes a user state collection module, a processing module and a light emission module, where an output terminal of the user state collection module is connected to an input terminal of the processing module, and an output terminal of the processing module is connected to a control terminal of the light emission module.

A light emission direction of the light emission module points to a side surface of the lens.

Optionally, the light emission module includes a light emission parameter configuration unit and a light emission unit, where an input terminal of the light emission parameter configuration unit is connected to the output terminal of the processing module, and an output terminal of the light emission parameter configuration unit is connected to a control terminal of the light emission unit.

The light emission parameter configuration unit is configured to receive target light emission data sent by the processing module and control, according to the target light emission data, the light emission unit to emit light. Optionally, the light emission parameter configuration unit includes a plurality of data sub-units, and the light emission unit includes a plurality of light emission sub-units, where the plurality of data sub-units are connected to the processing module, and the plurality of data sub-units are connected to the plurality of light emission sub-units in a one-to-one correspondence. The plurality of data sub-units are configured to receive the target light emission data sent by the processing module and control, according to the target light emission data, the plurality of light emission sub-units to emit light respectively.

Optionally, a data sub-unit of the plurality of data sub-units includes a data latch, where after being cascaded sequentially, data latches corresponding to the plurality of data sub-units are connected to the output terminal of the processing module, and output terminals of the data latches are connected to the plurality of light emission sub-units respectively.

Optionally, a light emission sub-unit of the plurality of light emission sub-units includes a power supply circuit, a red light-emitting diode, a green light-emitting diode and a blue light-emitting diode, where the red light-emitting diode, the green light-emitting diode and the blue light-emitting diode are powered through the power supply circuit, and a control terminal of the power supply circuit is connected to an output terminal of the data latch.

Optionally, the user state collection module includes a microphone, where an output terminal of the microphone is connected to the input terminal of the processing module.

The processing module is configured to receive sound data collected by the microphone, identify an emotion of a user according to the sound data, determine target light emission data according to the emotion of the user and send the target light emission data to the light emission module to adjust a light emission state of the light emission module.

Optionally, the user state collection module includes a motion sensor, where an output terminal of the motion sensor is connected to the input terminal of the processing module.

Optionally, the smart glasses further include a lens holder, where the lens is disposed within the lens holder, and the light emission module is disposed at a connection joint between the lens and the lens holder.

Optionally, the lens holder includes a frame and a temple, where the frame is connected to the temple, and the lens is disposed within the frame; the user state collection module further includes a temperature sensor, where an output terminal of the temperature sensor is connected to the input terminal of the processing module; the temperature sensor is disposed on an inner side of the temple; and when a user wears the smart glasses, the temperature sensor contacts a skin of the user.

Optionally, the user state collection module includes a wearing detection unit, where an output terminal of the wearing detection unit is connected to the input terminal of the processing module; the wearing detection unit is disposed on the inner side of the temple; and when the user wears the smart glasses, the wearing detection unit contacts the skin of the user.

In the smart glasses provided in the present application, the smart glasses include the lens and the light emission control circuit. The light emission control circuit includes the user state collection module, the processing module and the light emission module. The output terminal of the user state collection module is connected to the input terminal of the processing module. The output terminal of the processing module is connected to the control terminal of the light emission module. The light emission direction of the light emission module points to the side surface of the lens. The user state collection module is disposed so that the current state of the user can be monitored. Moreover, the side surface of the lens is provided with the light emission module, and by controlling the light emission module to emit light, the light emitted by the light emission module is refracted through the lens to change the color of the lens. In the present application, based on a topology in which the user state collection module, the processing module and the light emission module are simultaneously disposed, the color of the lens can be controlled via the state of the user, expanding the application scenarios of the smart glasses.

BRIEF DESCRIPTION OF DRAWINGS

To illustrate technical solutions in embodiments of the present application or in the related art more clearly, drawings used in the description of the embodiments or the related art are described briefly below. Apparently, the drawings described below illustrate only part of embodiments of the present application, and those of ordinary skill in the art may also obtain other drawings based on the drawings described below on the premise that no creative work is done.

Figure 1:
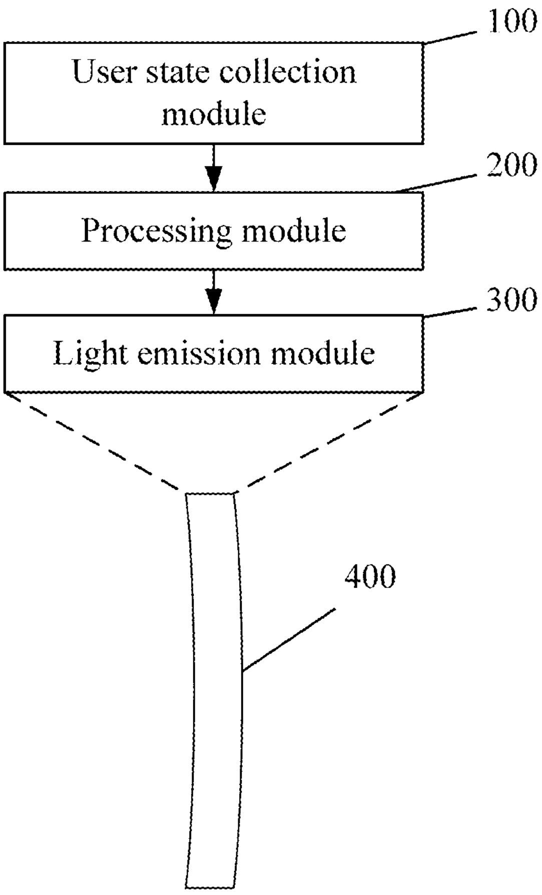
FIG. 1 is a diagram illustrating functional modules of smart glasses according to an embodiment of the present application.

Object implementation modes, functional features and advantages of the present application are further described in conjunction with the drawings.

REFERENCE LIST

100 user state collection module
- 110 microphone
- 120 motion sensor
- 130 temperature sensor
- 140 wearing detection unit
- 200 processing module
- 400 lens
- P1 detection electrode
- LC detection capacitance
- 300 light emission module
- 310 light emission parameter configuration unit
- 311 data latch
- 320 light emission unit
- 321 light emission sub-unit
- U1 processor
- U2 detection chip
- U3 low-dropout (LDO) chip
- U4 flash memory chip

DETAILED DESCRIPTION

It is to be understood that the embodiments described herein are only intended to explain the present application and not to limit the present application.

Technical solutions in the embodiments of the present application are described clearly and completely in conjunction with the drawings in the embodiments of the present application. Apparently, the embodiments described herein are part, not all, of the embodiments of the present application. Based on the embodiments of the present application, all other embodiments obtained by those of ordinary skill in the art on the premise that no creative work is done are within the scope of the present application.

It is to be noted that all the directional indications in the embodiments of the present application (such as "up", "down", "left", "right", "front" and "back") are used only for explaining the relative positional relationship and motion between components in a particular posture (as shown in the drawings), and if the particular posture changes, all the directional indication accordingly change.

Moreover, terms such as "first" and "second", if used herein, are for description only and are not to be construed as indicating or implying relative importance or implicitly indicating the number of technical features as indicated. Thus, a feature defined as a "first" feature or a "second" feature may expressly or implicitly include at least one of this feature. Moreover, the technical solutions of various embodiments may be combined with each other, but the combination must be capable of being performed by those of ordinary skill in the art. When the combination of the technical solutions is contradictory or impossible to perform, such combination does not exist and is not within the scope of the present application.

The present application provides smart glasses. Referring to FIG. 1, FIG. 1 is a diagram illustrating functional modules of smart glasses according to an embodiment of the present application. In this embodiment, the smart glasses include a lens 400 and a light emission control circuit.

The light emission control circuit includes a user state collection module 100, a processing module 200 and a light emission module 300. An output terminal of the user state collection module 100 is connected to an input terminal of the processing module 200. An output terminal of the processing module 200 is connected to a control terminal of the light emission module 300. The light emission module 300 is disposed on a side surface of the lens 400.

The user state collection module 100 is configured to monitor a related state of a user. After obtaining a detection signal based on the monitoring of the state of the user, the user state collection module 100 outputs the detection signal to the processing module 200.

The processing module 200 determines the state of the user according to the detection signal and controls, based on the state of the user, the light emission module 300 to perform a light emission operation. It is to be noted that the processing module 200 may be an existing device having a data processing capability in the smart glasses or may also be an additional device that is particularly disposed to control the light emission module 300.

When the light emission module 300 performs the light emission operation, light emitted by the light emission module 300 is incident from the side surface of the lens 400 into the lens 400 and changes the color of the lens 400 after being refracted by the lens 400.

In this embodiment, the user state collection module 100 is disposed so that the current state of the user can be monitored. Moreover, the side surface of the lens 400 is provided with the light emission module 300, and by controlling the light emission module 300 to emit light, the light emitted by the light emission module 300 is refracted through the lens 400 to change the color of the lens 400. In the present application, based on a topology in which the user state collection module 100, the processing module 200 and the light emission module 300 are simultaneously disposed, the color of the lens 400 can be controlled via the state of the user, expanding the application scenarios of the smart glasses.

Figure 2:
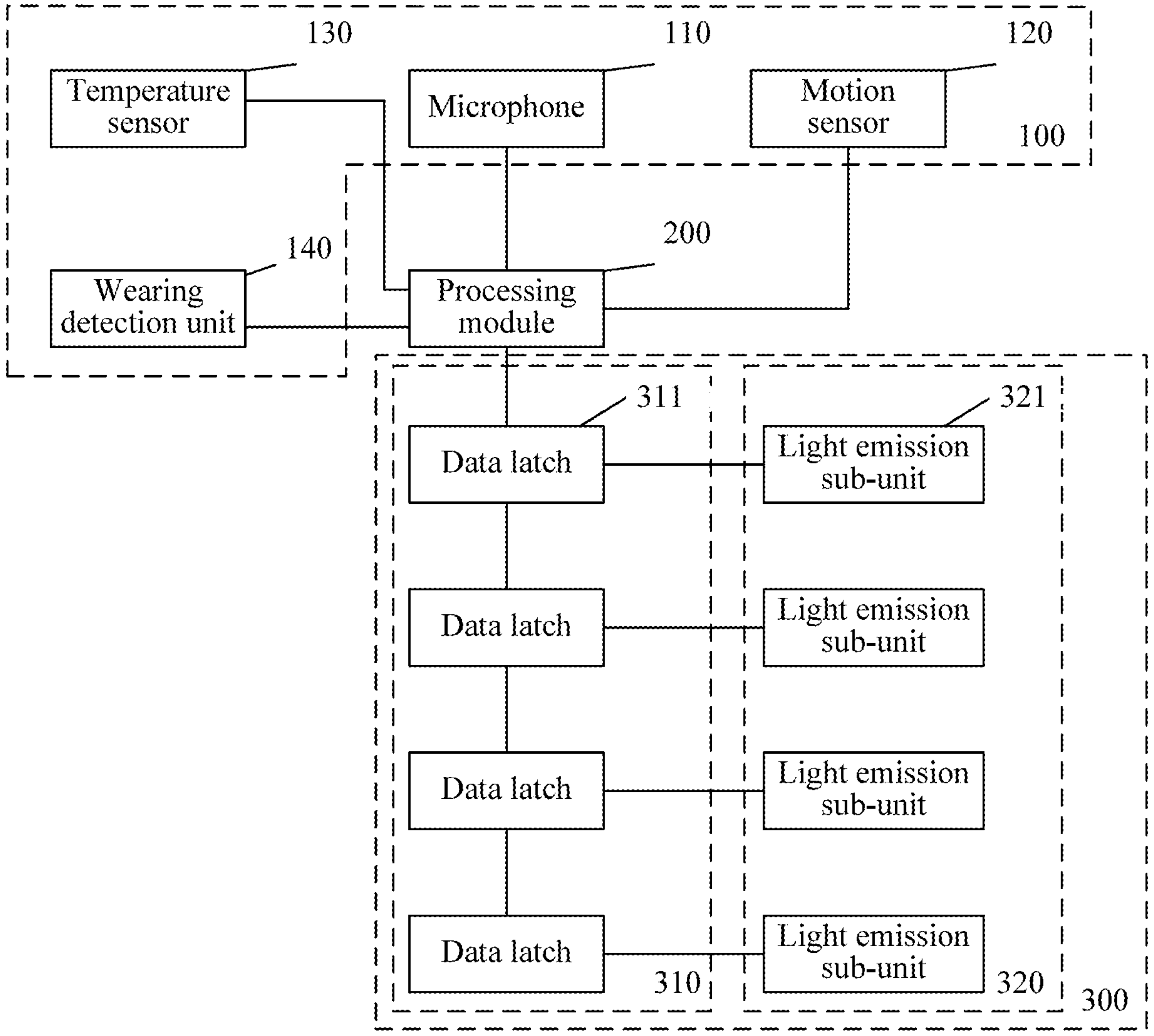
FIG. 2 is a diagram illustrating functional modules of smart glasses according to another embodiment of the present application.

Further, referring to FIG. 2, subsequently, the light emission module 300 includes a light emission parameter configuration unit 310 and a light emission unit 320. An input terminal of the light emission parameter configuration unit 310 is connected to the output terminal of the processing module 200, and an output terminal of the light emission parameter configuration unit 310 is connected to a control terminal of the light emission unit 320.

The light emission parameter configuration unit 310 is configured to receive target light emission data sent by the processing module 200 and control, according to the target light emission data, the light emission unit 320 to emit light.

The light emission unit 320 is configured to perform the light emission operation. The light emission parameter configuration unit 310 is configured to set a specific light emission state of the light emission unit 320.

The target light emission data indicates a target light emission state of the light emission unit 320. The target light emission data is output by the processing module 200. The target light emission data may be set by the user and the processing module 200 through data interaction, may also default setting of the processing module 200, or may also be generated by the processing module 200 based on a preset rule through the detection signal collected by the user state collection module 100.

After receiving the target light emission data, the light emission parameter configuration unit controls the light emission unit 320 to perform the light emission operation through the target light emission data.

Further, the light emission parameter configuration unit 310 includes multiple data sub-units, and the light emission unit 320 includes multiple light emission sub-units 321. The multiple data sub-units are connected to the processing module 200. The multiple data sub-units are connected to the multiple light emission sub-units 321 in a one-to-one correspondence.

The multiple data sub-units are configured to receive the target light emission data sent by the processing module 200 and control, according to the target light emission data, the multiple light emission sub-units 321 to emit light respectively.

In this embodiment, the multiple light emission sub-units 321 are disposed. The multiple light emission sub-units 321 are controlled so that different light can be emitted through the different light emission sub-units 321 at the same time, increasing the diversity of colors of the lens 400. It is to be noted that the multiple light emission sub-units 321 may not only emit the different light but also uniformly perform the same light emission operation to emit the same light. Specifically, light emission operations on the different light emission sub-units 321 may be set based on actual application requirements.

It is to be noted that each data sub-unit may be connected to the processing module 200, that is, each data sub-unit receives the target light emission data output by the processing module 200 separately; after being cascaded, the multiple data sub-units may also be connected to the processing module 200, that is, the processing module 200 sends the target light emission data to the multiple data sub-units through one data transmission line.

Further, a data sub-unit includes a data latch 311. After being cascaded sequentially, data latches 311 corresponding to the multiple data sub-units are connected to the output terminal of the processing module 200, and output terminals of the data latches 311 are connected to the multiple light emission sub-units 321 respectively.

The processing module 200 sends the target light emission data corresponding to all the light emission sub-units 321 to the cascaded data latches 311. One data latch 311 correspondingly acquires light emission data of one light emission unit 320. Based on the cascade relationship, each time the target light emission data reaches one data latch 311, after the data latch 311 acquires corresponding light emission data such as first several bits of data in the target light emission data, the target light emission data is reduced by the data taken away by the data latch 311 and transmitted to the next data latch 311. As passing through more and more data latches 311, the target light emission data becomes less and less until the last data latch 311 acquires corresponding light emission data. At this time, each data latch 311 stores light emission data of a respective light emission unit 320, and the target light emission data finishes being transmitted. In this case, all the data latches 311 send the stored light emission data to the multiple light emission sub-units 321 respectively to enable the multiple light emission sub-units 321 to perform light emission operations according to the corresponding light emission data.

Further, a light emission sub-unit 321 includes a power supply circuit, a red light-emitting diode, a green light-emitting diode and a blue light-emitting diode. The red light-emitting diode, the green light-emitting diode and the blue light-emitting diode are powered through the power supply circuit, and a control terminal of the power supply circuit is connected to an output terminal of the data latch 311.

In this embodiment, selectable colors of the light emission operations are formed by three primary colors of red, green and blue.

Specifically, in this embodiment, an emitted color of a single light emission sub-unit 321 is controlled through 24 bits of light emission data, and each 8 bits of the 24 bits of light emission data is used for controlling the brightness of a primary color; after receiving the light emission data, the power supply circuit determines the brightness corresponding to the red color, the green color and the blue color separately to determine magnitudes of voltages for supplying power to the red light-emitting diode, the green light-emitting diode and the blue light-emitting diode respectively, thereby controlling the colors of the multiple light emission sub-units 321.

It is to be noted that in an actual application, in addition to independently disposing the data latches 311 and the multiple light emission sub-units 321, addressable light-emitting diodes (LED) may also be selected for performing the different light emission operations.

Further, the user state collection module 100 includes a microphone 110. An output terminal of the microphone 110 is connected to the input terminal of the processing module 200.

The processing module 200 is configured to receive sound data collected by the microphone 110, identify an emotion of the user according to the sound data, determine the target light emission data according to the emotion of the user and send the target light emission data to the light emission module 300 to adjust a light emission state of the light emission module 300. For example, the processing module 200 may identify the emotion of the user through a zero-crossing rate, energy, pitch disturbance and other features of the sound data or may process the sound data based on a deep learning method to identify the emotion of the user. A specific identification method is not repeated. The microphone 110 is configured to collect the sound data of the user so that the processing module 200 can control the light emission module 300 based on the sound data.

It is to be understood that a speaking manner of the user can reflect the emotion of the user to a certain extent; for example, when the user speaks relatively fast at a relatively high frequency, it may be considered that the user is currently excited, and at this time, the light emission module 300 may be enabled to emit light matching the excitement, such as the red light, so that the lens 400 can be red; when the user speaks relatively slowly at a relatively low frequency, it may be considered that the current emotion of the user is relatively gentle, and at this time, the light emission module 300 may be enabled to emit light matching the gentleness, such as the blue light, so that the lens 400 can be blue. Specifically, how to control the light emission module 300 based on the sound data of the user may be set based on an actual requirement or an option of the user.

Further, the user state collection module 100 includes a motion sensor 120. An output terminal of the motion sensor 120 is connected to the input terminal of the processing module 200.

The motion sensor 120 is configured to collect motion data of the user. The specific type of the motion sensor 120 may be set based on actual application requirements, such as a gyroscope.

It is to be understood that a motion state of the user can reflect the emotion of the user to a certain extent; for example, when the motion state of the user is relatively intense, it may be considered that the emotion of the user is relatively high, and at this time, the light emission module 300 may be enabled to perform a relatively enthusiastic light emission operation such as flashing warm light; when the motion state of the user is relatively slow, it is considered that the user currently tends to be calm, and at this time, the light emission module 300 may be enabled to emit light matching the calmness, such as changing cold light. Specifically, how to control the light emission module 300 based on the motion data of the user may be set based on an actual requirement or an option of the user.

Further, the smart glasses further include a lens holder. The lens 400 is disposed within the lens holder, and the light emission module 300 is disposed at a connection joint between the lens 400 and the lens holder.

Generally, the lens 400 is connected to the lens holder through the side surface of the lens 400 to fix the lens 400. Therefore, the light emission module 300 may be disposed at the connection joint between the lens 400 and the lens holder so that in the case where the light emission module 300 can emit light into the lens 400, the light emission module 300 can also be hidden within the lens holder, making the smart glasses more beautiful. It is to be noted that a fixing manner of the lens 400 and a setting position of the light emission module 300 may be set differently from this embodiment based on actual requirements.

Further, the lens holder includes a frame and a temple. The frame is connected to the temple, and the lens 400 is disposed within the frame; the user state collection module 100 further includes a temperature sensor 130, where an output terminal of the temperature sensor 130 is connected to the input terminal of the processing module 200; the temperature sensor 130 is disposed on an inner side of the temple; and when the user wears the smart glasses, the temperature sensor 130 contacts the skin of the user.

The frame is configured to fix the lens 400. The temple is configured to fix the smart glasses through an ear.

The temperature sensor 130 is configured to detect the skin temperature of the user.

It is to be understood that the skin temperature of the user can reflect an environmental condition, a motion condition of the user and a fever condition of the user; for example, when the skin temperature of the user is relatively high, it may be considered that the environment is relatively hot, the user is exercising, or the user has a fever, and at this time, the light emission operation of the light emission module 300 may be set based on a corresponding condition. To more accurately collect the skin temperature of the user, the temperature sensor 130 may be disposed on the inner side of the temple so that when the user wears the smart glasses, the temperature sensor 130 can contact the skin of the user, thereby detecting the skin temperature.

Further, the user state collection module 100 includes a wearing detection unit 140. An output terminal of the wearing detection unit 140 is connected to the input terminal of the processing module 200; the wearing detection unit 140 is disposed on the inner side of the temple; and when the user wears the smart glasses, the wearing detection unit 140 contacts the skin of the user.

It is to be understood that when the user does not wear the smart glasses, if the light emission module 300 continues to emit light, it is easy to cause insufficient power of the smart glasses; in this embodiment, the wearing detection unit 140 is disposed to detect a wearing condition of the user so that when the user does not wear the smart glasses, the light emission module 300 can be controlled not to perform the light emission operation to save power; when the user wears the smart glasses, the light emission module 300 can be controlled to perform the light emission operation to change the color of the lens 400.

An implementable circuit structure for the present application is described below with reference to FIGS. 3 to 8.

Figure 3:
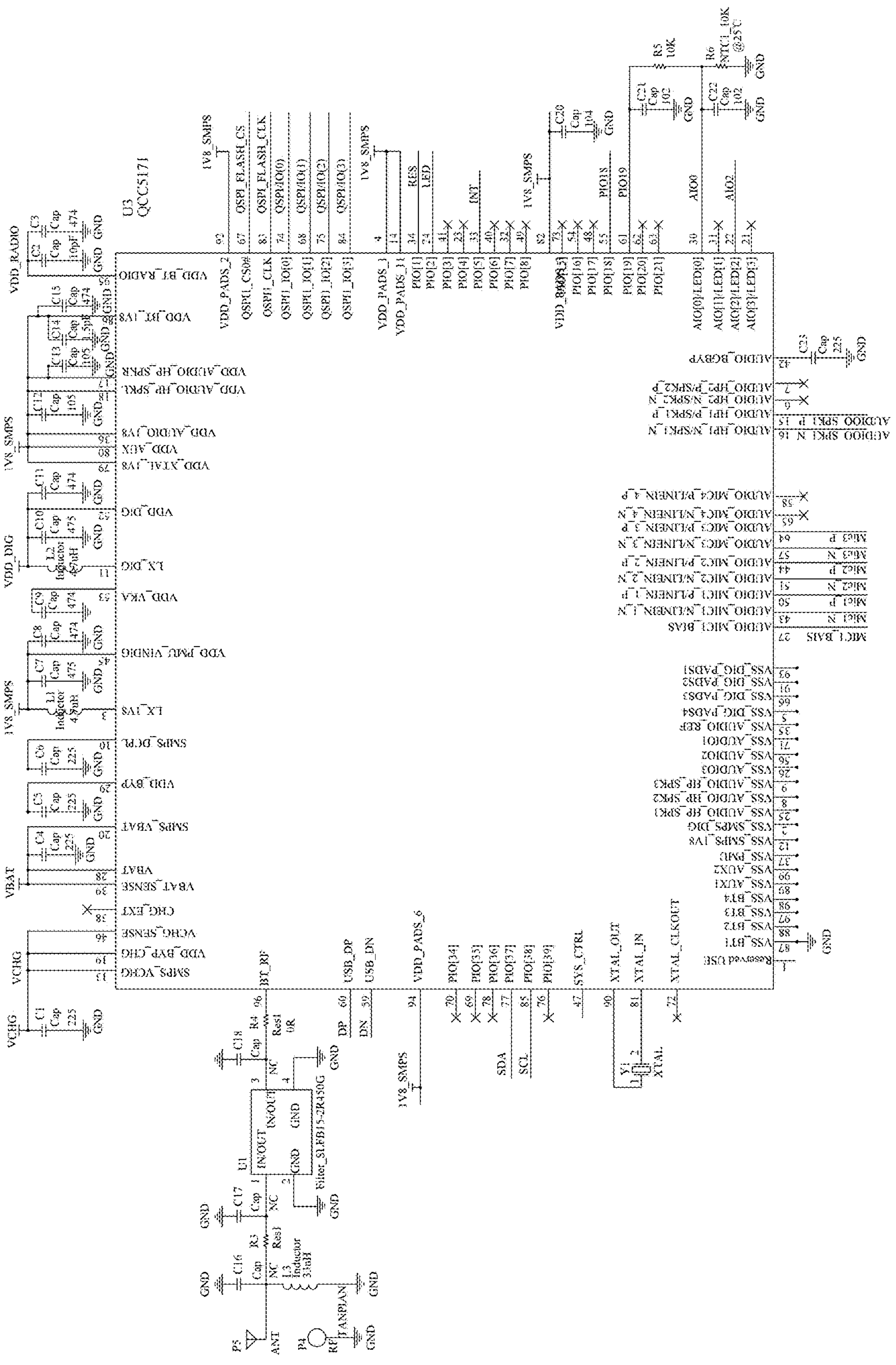
FIG. 3 is a diagram illustrating the configuration of a processing module of smart glasses according to an embodiment of the present application.

FIG. 3 is a diagram illustrating the configuration of the processing module 200. The processing module 200 includes a processor U1. The model of the processor U1 is QCC5171.

Figure 4:
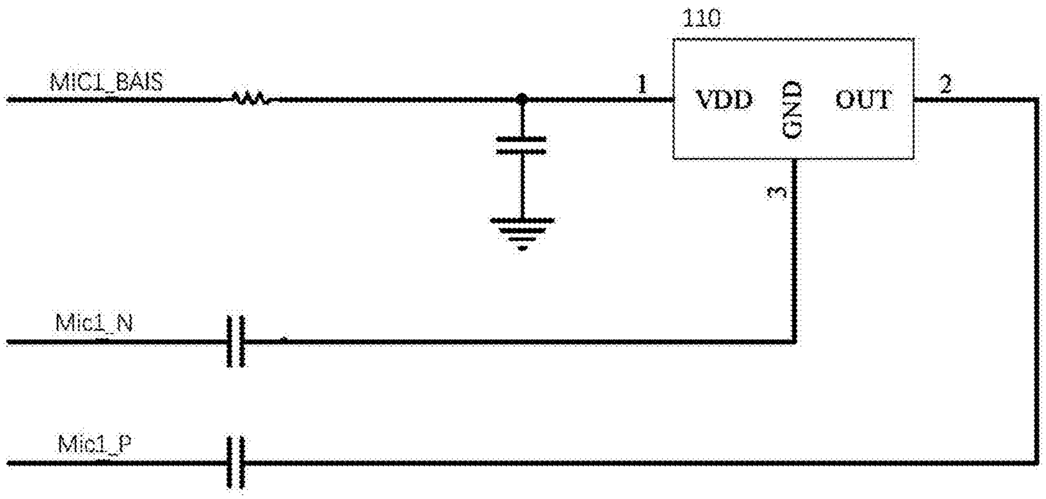
FIG. 4 is a diagram illustrating the structure of a microphone of smart glasses according to an embodiment of the present application.

FIG. 4 is a diagram illustrating the structure of the microphone 110. An input pin MIC1_BAIS of the microphone 110 is connected to an AUDIO_MIC1_BIAS pin of the processor U1. A positive pin Mic1_P of the microphone 110 is connected to an AUDIO_MIC1_P pin of the processor U1. A negative pin Mic1_N of the microphone 110 is connected to an AUDIO_MIC1_N pin of the processor U1.

Figure 5:
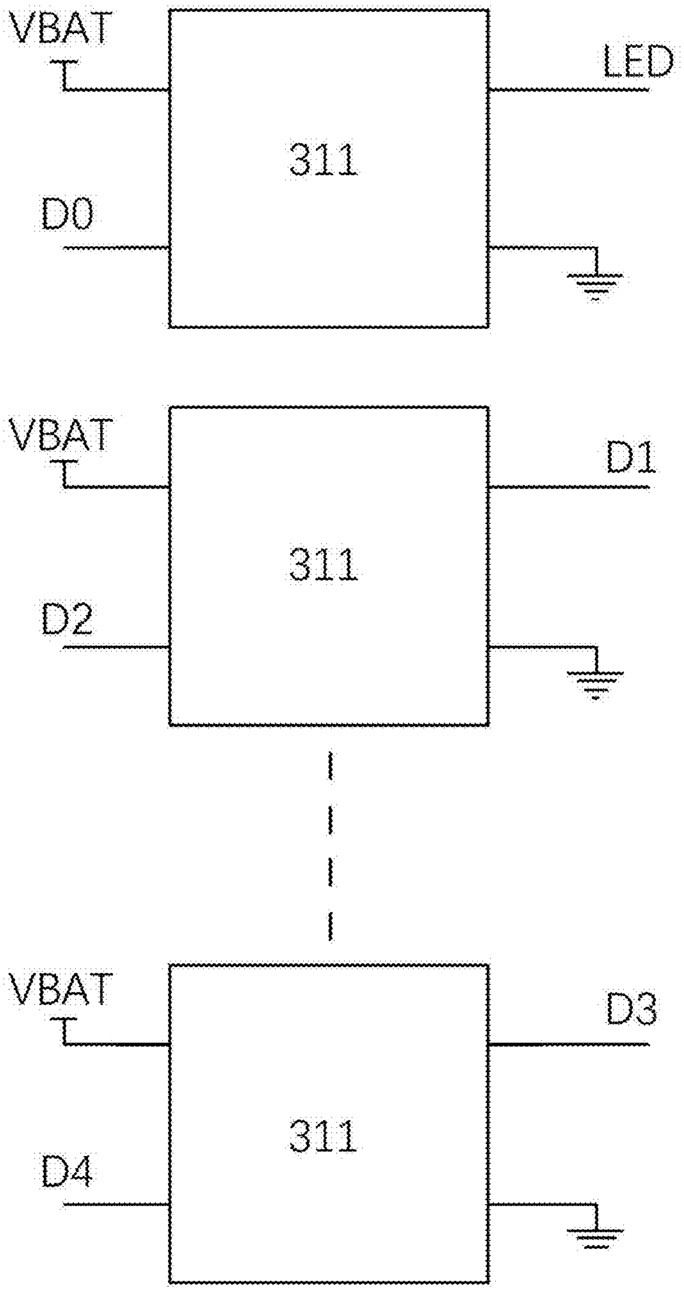
FIG. 5 is a diagram illustrating the structure of a light emission module of smart glasses according to an embodiment of the present application.

FIG. 5 is a diagram illustrating the structure of the light emission module 300. The light emission module includes the multiple data latches 300 that are sequentially cascaded. Each data latch 311 is correspondingly connected to one light emission unit 320 (not shown in FIG. 5). An input terminal LED of a first data latch 311 is connected to a PIO (2) pin of the processor U1.

Figure 6:
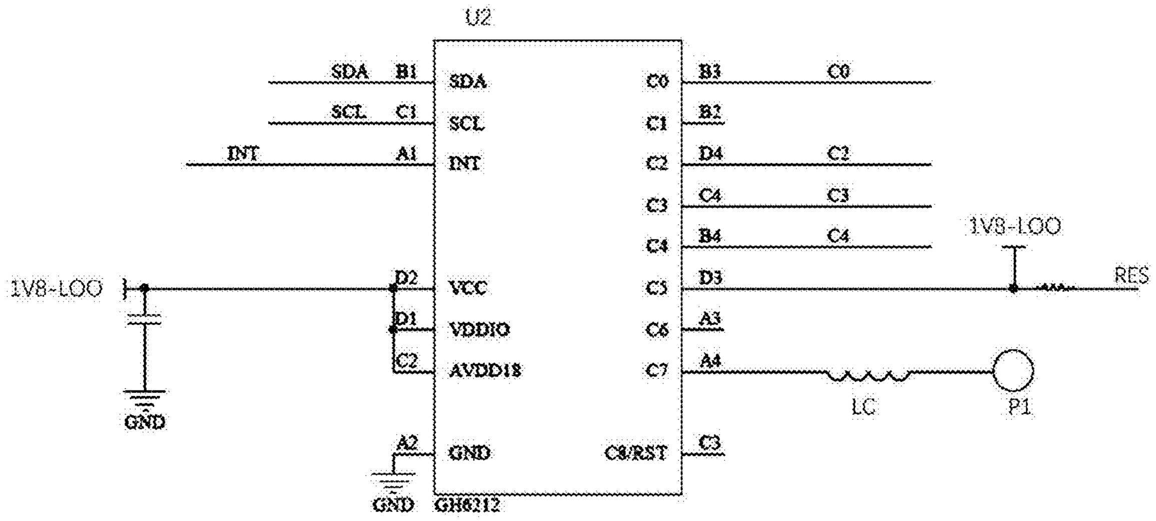
FIG. 6 is a diagram illustrating the structure of a wearing detection unit of smart glasses according to an embodiment of the present application.

FIG. 6 is a diagram illustrating the structure of the wearing detection unit 140. The wearing detection unit includes a detection chip U2, a detection capacitance LC and a detection electrode P1. The detection electrode P1 is connected to a detection pin of the detection chip through the detection capacitance LC. An output pin RES of the detection signal is connected to a PIO (1) pin of the processor U1.

Figure 7:
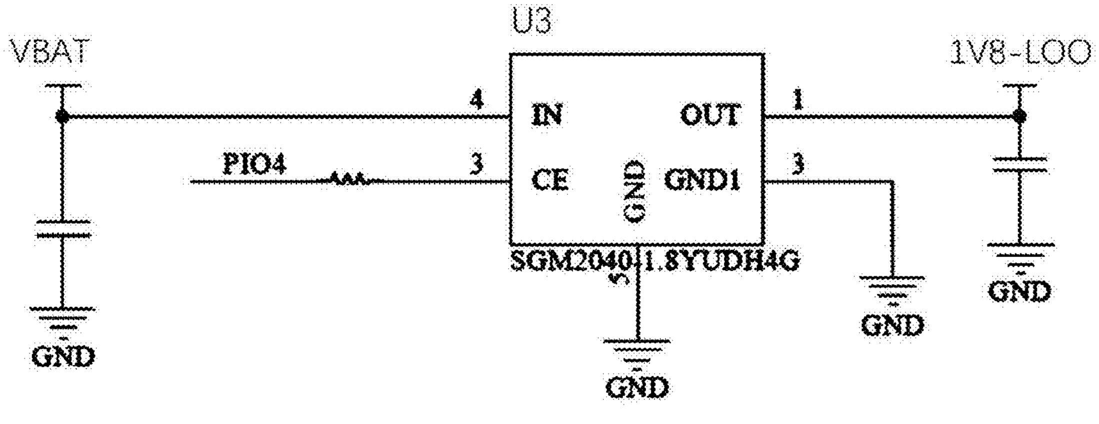
FIG. 7 is a diagram illustrating the structure of a power management circuit of smart glasses according to an embodiment of the present application.

It is to be understood that the operation of various devices requires the support of different voltages, so a power management circuit is also provided in the present application. FIG. 7 is a diagram illustrating the structure of the power management circuit. The power management circuit includes an LDO chip U3. The LDO chip U3 is configured to convert a power supply voltage to a voltage required by a device.

Figure 8:
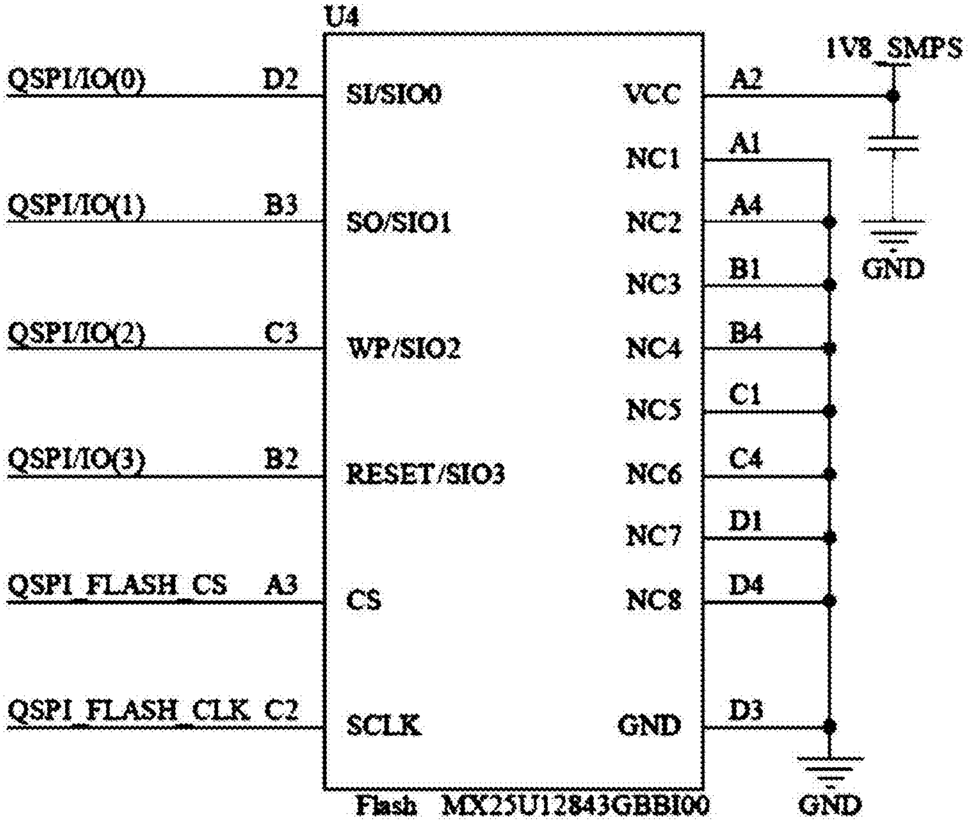
FIG. 8 is a diagram illustrating the structure of a flash memory module of smart glasses according to an embodiment of the present application.

The processing module 200 is required to store data in the process of acquiring related detection data, generating the target light emission data and operating, so a flash memory module is also provided in the present application. FIG. 8 is a diagram illustrating the structure of the flash memory module. The flash memory module includes a flash memory chip U4. An input pin QSPI/IO (0) of the flash memory chip U4, an output pin QSPI/IO (1) of the flash memory chip U4, a write protection pin QSPI/IO (3) of the flash memory chip U4, a reset pin QSPI/IO (4) of the flash memory chip U4, a clock pin QSPI_FLASH_CLK of the flash memory chip U4 and a chip select pin QSPI_FLASH_CS of the flash memory chip U4 are connected to the pins of the processor U1 respectively.

It is to be noted that FIGS. 3 to 8 illustrate the implementable circuit structure for the present application, and other circuit structures may be used in some other possible embodiments.

It is to be noted that as used herein, the term "comprising", "including" or any other variant thereof is intended to encompass a non-exclusive inclusion so that a process, method, article or system that includes a series of elements not only includes the expressly listed elements but also includes other elements that are not expressly listed or are inherent to such a process, method, article or system. Without further limitations, an element defined by the phrase "comprising a . . . " does not exclude the presence of additional identical elements in the process, method, article, or system that includes this element. The serial numbers of the embodiments of the preceding present application are only for ease of description and do not indicate superiority and inferiority of the embodiments.

The preceding are preferred embodiments of the present application and are not intended to limit the scope of the present application. Any equivalent structure transformation or equivalent process transformation made by using the content of the description and drawings of the present application, or directly or indirectly applied in another related technical art, are likewise included in the scope of the present application.

What is claimed is:

1. Smart glasses, comprising:

a lens, a user state collection module, a processing module and a light emission module, wherein an output terminal of the user state collection module is connected to an input terminal of the processing module, and an output terminal of the processing module is connected to a control terminal of the light emission module;

wherein a light emission direction of the light emission module points to a side surface of the lens;

wherein the user state collection module comprises a microphone, and an output terminal of the microphone is connected to the input terminal of the processing module; and wherein the processing module is configured to receive sound data collected by the microphone, identify an emotion of a user according to the sound data, determine target light emission data according to the emotion of the user and send the target light emission data to the light emission module to adjust a light emission state of the light emission module.

2. The smart glasses of claim 1, wherein the light emission module comprises a light emission parameter configuration unit and a light emission unit, wherein an input terminal of the light emission parameter configuration unit is connected to the output terminal of the processing module, and an output terminal of the light emission parameter configuration unit is connected to a control terminal of the light emission unit, and wherein the light emission parameter configuration unit is configured to receive target light emission data sent by the processing module and control, according to the target light emission data, the light emission unit to emit light.

3. The smart glasses of claim 2, wherein the light emission parameter configuration unit comprises a plurality of data sub-units, and the light emission unit comprises a plurality of light emission sub-units, wherein the plurality of data sub-units are connected to the processing module, and the plurality of data sub-units are connected to the plurality of light emission sub-units in a one-to-one correspondence, and wherein each of the plurality of data sub-units is configured to receive the target light emission data sent by the processing module and control, according to the target light emission data, a respective one of the plurality of light emission sub-units to emit light.

4. The smart glasses of claim 3, wherein a data sub-unit of the plurality of data sub-units comprises a data latch, wherein after being cascaded sequentially, data latches corresponding to the plurality of data sub-units are connected to the output terminal of the processing module, and output terminals of the data latches are connected to the plurality of light emission sub-units in a one-to-one correspondence.

5. The smart glasses of claim 4, wherein a light emission sub-unit of the plurality of light emission sub-units comprises a power supply circuit, a red light-emitting diode, a green light-emitting diode and a blue light-emitting diode, and wherein the red light-emitting diode, the green light-emitting diode and the blue light-emitting diode are powered through the power supply circuit, and a control terminal of the power supply circuit is connected to an output terminal of the data latch.

6. The smart glasses of claim 1, wherein the user state collection module comprises a motion sensor, and an output terminal of the motion sensor is connected to the input terminal of the processing module.

7. The smart glasses of claim 1, further comprising a lens holder, wherein the lens is disposed within the lens holder, and the light emission module is disposed at a connection joint between the lens and the lens holder.

8. The smart glasses of claim 7, wherein the lens holder comprises a frame and a temple, the frame is connected to the temple, and the lens is disposed within the frame;

wherein the user state collection module further comprises a temperature sensor, an output terminal of the temperature sensor is connected to the input terminal of the processing module, and the temperature sensor is disposed on an inner side of the temple; and wherein when the user wears the smart glasses, the temperature sensor contacts the user's skin.

9. The smart glasses of claim 8, wherein the user state collection module comprises a wearing detection unit, and an output terminal of the wearing detection unit is connected to the input terminal of the processing module; and wherein the wearing detection unit is disposed on the inner side of the temple, and when the user wears the smart glasses, the wearing detection unit contacts the user's skin.

* * * * *